United States Patent
Sakamoto

(10) Patent No.: US 12,041,393 B2
(45) Date of Patent: Jul. 16, 2024

(54) PROJECTOR CONTROLLING METHOD AND PROJECTION SYSTEM

(71) Applicant: SEIKO EPSON CORPORATION, Tokyo (JP)

(72) Inventor: Eisuke Sakamoto, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/987,982

(22) Filed: Nov. 16, 2022

(65) Prior Publication Data

US 2023/0156166 A1 May 18, 2023

(30) Foreign Application Priority Data

Nov. 16, 2021 (JP) .................. 2021-186237

(51) Int. Cl.
*H04N 9/31* (2006.01)

(52) U.S. Cl.
CPC ......... *H04N 9/3185* (2013.01); *H04N 9/3173* (2013.01)

(58) Field of Classification Search
CPC .. G03B 21/145; H04N 9/3141; H04N 9/3185; H04N 9/3173; H04N 9/317; H04N 9/3182; H04N 9/3194; F16M 11/00; F16M 13/00–08; F16M 2200/00–08
See application file for complete search history.

(56) References Cited

U.S. PATENT DOCUMENTS

| | | | |
|---|---|---|---|
| 2003/0002016 A1* | 1/2003 | Sellen ................. | H04N 9/3141 348/E5.122 |
| 2007/0058141 A1* | 3/2007 | Ozaki ................. | H04N 9/3141 348/E5.143 |
| 2008/0297742 A1 | 12/2008 | Muneishi et al. | |
| 2009/0036158 A1* | 2/2009 | Fujinawa ............. | H04N 9/3185 455/556.1 |
| 2015/0177601 A1* | 6/2015 | Imai ..................... | G03B 21/142 353/121 |
| 2016/0073073 A1* | 3/2016 | Ha ....................... | H04N 9/3173 353/28 |
| 2017/0310939 A1* | 10/2017 | Lin ...................... | G06F 3/0202 |

(Continued)

FOREIGN PATENT DOCUMENTS

| | | |
|---|---|---|
| JP | 2005-099620 A | 4/2005 |
| JP | 2005-164930 A | 6/2005 |

(Continued)

*Primary Examiner* — John W Miller
*Assistant Examiner* — Humam M Satti
(74) *Attorney, Agent, or Firm* — Dority & Manning, P.A.

(57) ABSTRACT

A projector controlling method including projecting, by a projector, a projection image by using first setting values with the projector attached to a base apparatus that specifies the direction in which the projector projects projection light and the position where the projector is installed, changing the settings of the projector from the first setting values to second setting values when the projector is detached from the base apparatus, and changing the settings of the projector from the second setting values to the first setting values when the projector detects that the projector is attached to the base apparatus, and the set of first setting values and the set of second setting values each including a parameter relating to geometric correction of the projection image.

8 Claims, 8 Drawing Sheets

(56) References Cited

U.S. PATENT DOCUMENTS

2018/0188641 A1* 7/2018 Chen .................... H01L 27/092
2021/0067754 A1* 3/2021 Fujimori .............. H04N 9/3179

FOREIGN PATENT DOCUMENTS

| JP | 2006-025232 A | 1/2006 |
| --- | --- | --- |
| JP | 2006-208830 A | 8/2006 |
| JP | 2006-208832 A | 8/2006 |
| JP | 2008-301156 A | 12/2008 |
| JP | 2010-243845 A | 10/2010 |
| JP | 2011-203517 A | 10/2011 |
| JP | 2013-109181 A | 6/2013 |
| JP | 2019-148652 A | 9/2019 |

* cited by examiner

PROJECTOR CONTROLLING METHOD AND PROJECTION SYSTEM

The present application is based on, and claims priority from JP Application Serial Number 2021-186237, filed Nov. 16, 2021, the disclosure of which is hereby incorporated by reference herein in its entirety.

BACKGROUND

1. Technical Field

The present disclosure relates to a projector controlling method and a projection system.

2. Related Art

There is a known related-art technology that allows a projector to be attachable to and detachable from a pedestal. For example, in the projection system disclosed in JP-A-2006-208832, the pedestal apparatus includes a tuner that sends image and audio signals, and a coupler that electrically couples the projector and the tuner to each other, and sends the image and audio signals to the projector.

As described in JP-A-2006-208832, the projector, which can be detached from the pedestal and carried around, needs to have the settings thereof changed in accordance with the location where the projector is installed, and the setting operation imposes a burden on the user.

SUMMARY

An aspect of the present disclosure relates to a projector controlling method including causing a projector to project a projection image by using first setting values with the projector attached to a base apparatus that specifies a direction in which the projector projects projection light, and a position where the projector is installed, changing settings of the projector from the first setting values to second setting values when the projector is detached from the base apparatus, and changing the settings of the projector from the second setting values to the first setting values when the projector detects that the projector is attached to the base apparatus, and the set of first setting values and the set of second setting values each include a parameter relating to geometric correction of the projection image.

Another aspect at the present disclosure relates to a projection system including a projector including a projection apparatus that projects a projection image and a controller, and a base apparatus that specifies, when the projector is attached thereto, a direction in which the projector projects projection light and a position where the projector is installed. The controller causes the projection apparatus to project the projection image by using first setting values with the projector attached to the base apparatus, changes settings of the projector from the first setting values to second setting values when the projector is detached from the base apparatus, and changes the settings of the projector from the second setting values to the first setting values when the projector detects that the projector is attached to the base apparatus. The set of first setting values and the set of second setting values each include a parameter relating to geometric correction of the projection image.

DESCRIPTION OF EXEMPLARY EMBODIMENTS

1. First Embodiment 1-1. Configuration of Projection System

Figure 1:
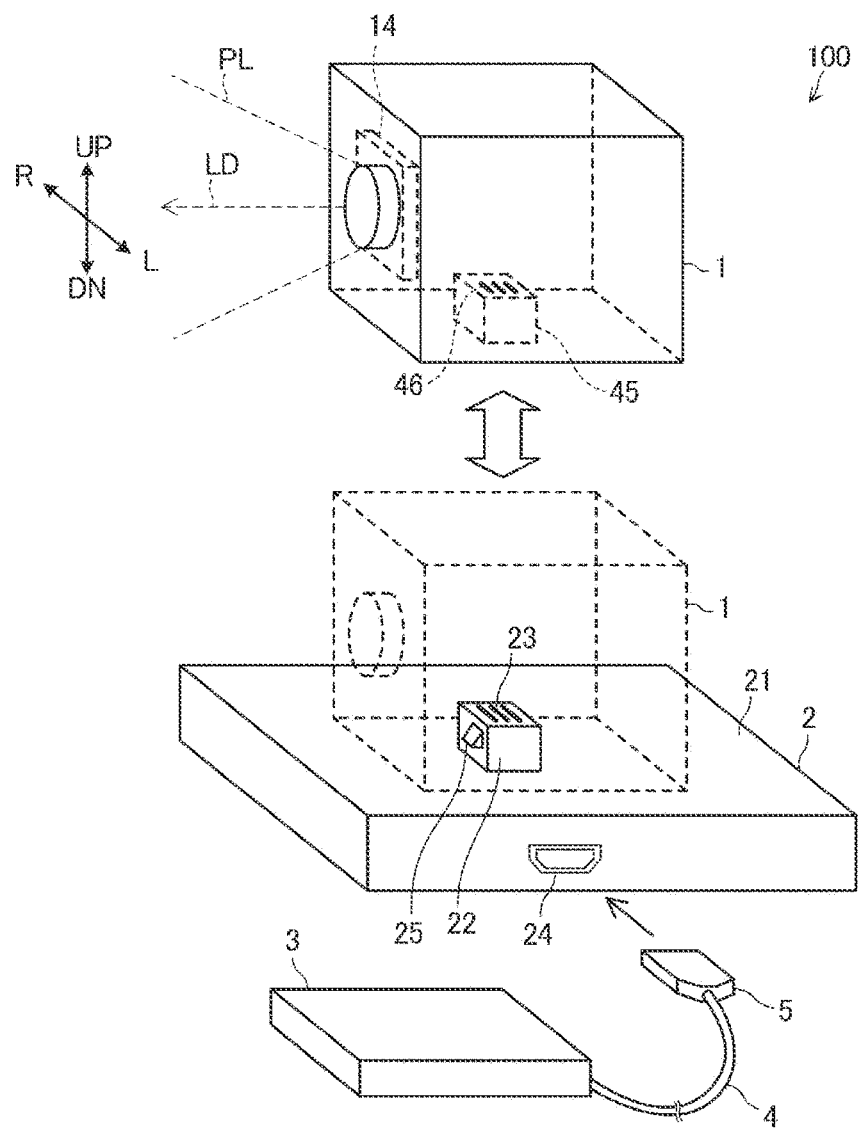
FIG. 1 is an exterior view of a projection system.

FIG. 1 is an exterior view of a projection system 100 according to a first embodiment and is also a perspective view of a projector 1 and a base apparatus 2 that form the projection system 100. The projector 1 is attached to the base apparatus 2, and the resultant structure forms the projection system 100.

The projector 1 projects image light PL toward a projection target to form an image on the projection target. The projection of the image light PL performed by the projector 1 corresponds to displaying an image on the projection target. This action is called displaying in the following description. In the following description, the image includes video and still images. The image light PL is not limited to light that forms an image, and may, for example, be illumination light with which the space where the projector 1 is installed is illuminated. Specifically, the image light PL may be monochromatic light.

The projector 1 is attachable to and detachable from the base apparatus 2. The base apparatus 2 is installed at the location where the projection system 100 is used. The base apparatus 2 is installed at a specific location where the projection system 100 is used with the base apparatus 2 oriented in a specific direction and located in a specific position. For example, the base apparatus 2 may be fixed in an immobile manner with the aid of screws, glue, or any other means. The base apparatus 2 may instead be fixed with the aid of a detachable component or a component that holds the base apparatus 2 so as not to allow the base apparatus 2 to readily move.

With the projector 1 attached to the base apparatus 2, the projector 1 is placed at an upper surface 21 of the base apparatus 2. The upper surface 21 is provided with a protrusion 22. Coupling terminals 23 are disposed at the protrusion 22.

A recess 45 is formed in the bottom surface of the projector 1. The protrusion 22 fits into the recess 45 with the projector 1 placed at the upper surface 21. The protrusion 22 having a rectangular columnar shape shown in FIG. 1 is presented by way of example, and the shape and size of the protrusion 22 is arbitrarily changeable. The shape and size of the recess 45 only need to allow formation of a space capable of accommodating the protrusion 22.

Coupling terminals 46 are disposed at the recess 45. The coupling terminals 46 are in contact with the coupling terminals 23 with the projector 1 installed at the upper surface 21. The coupling terminals 23 and 46 are electrical contacts made of metal or any other conductor. The coupling terminals 23 and 46, when being in contact with each other, electrically couple the projector 1 to the base apparatus 2. The projector 1 and the base apparatus 2 transmit an image signal via the coupling terminals 23 and 46, as will be described later.

A switch 25 is disposed at the protrusion 22. The switch 25 is a switch turned on when the switch 25 is pressed. FIG. 1 shows an example in which the switch 25 is disposed at a side surface of the protrusion 22, but there is no restriction on the position of the switch 25. For example, the switch 25 may be disposed at the upper end of the protrusion 22. When the protrusion 22 fits into the recess 45, the switch 25 comes into contact with the inner surface of the recess 45, so that the switch 25 is pressed and turned on. That is, the switch 25 functions as a sensor that detects that the projector 1 has been attached to the base apparatus 2. The switch 25 corresponds to an example of a detecting section.

The switch 25 is an example of a sensor that detects that the projector 1 has been attached to the base apparatus 2. For example, the switch 25 may be replaced with an optical or magnetic sensor that detects the proximity of the protrusion 22 to the projector 1.

An image source 3 is coupled to the base apparatus 2. The image source 3 is an apparatus that outputs an image signal. The image source 3 may be an image output device, for example, a media player and a digital camera. Examples of the image source 3 may include a personal computer, a smartphone, a tablet terminal, and other information processing terminals.

The base apparatus 2 includes a connector 24. A connector 5 formed at the front end of a cable 4, which electrically couples the base apparatus 2 to the image source 3, can be coupled to the connector 24.

The connectors 24 and 5 are connectors compliant with a standard for image signal transmission. Examples of the standard for image signal transmission may include HDMI (high-definition multimedia interface), USB-typeC (universal serial bus type C), DisplayPort, HDBaseT, and DVI (digital visual interface), and any other standard may also be used. HDMI, DisplayPort, and HDBaseT are registered trademarks.

The connectors 24 and 5 may each be an RCA terminal, a VGA terminal, an S terminal, a D terminal, or any other terminal via which an analog image signal is inputted and outputted. The base apparatus 2 may include a plurality of connectors 24. In this case, the plurality of connectors 24 may differ from one another in terms of type and standard.

The base apparatus 2, the image source 3, and the cable 4 may be capable of transmission and reception of control signals between the base apparatus 2 and the image source 3. The control signals are, for example, signals from the base apparatus 2 to the image source 3 that instruct the image source 3 to pause and resume image output. The present embodiment will be described with reference to a case where the cable 4 is an HDMI cable, and the connectors 24 and 5 comply with the HDMI standard. In the configuration described above, the base apparatus 2 and the image source 3 can transmit and receive the control signals via a CEC (consumer electronics control) link.

The projector 1 can display an image with the projector 1 attached to the base apparatus 2 or the projector 1 separated from the base apparatus 2. The projector 1 includes a shifter 14, which changes the direction in which the image light PL is projected. The shifter 14 shifts the image light PL by shifting a projection lens or any other component provided in the projector 1.

Figure 4:
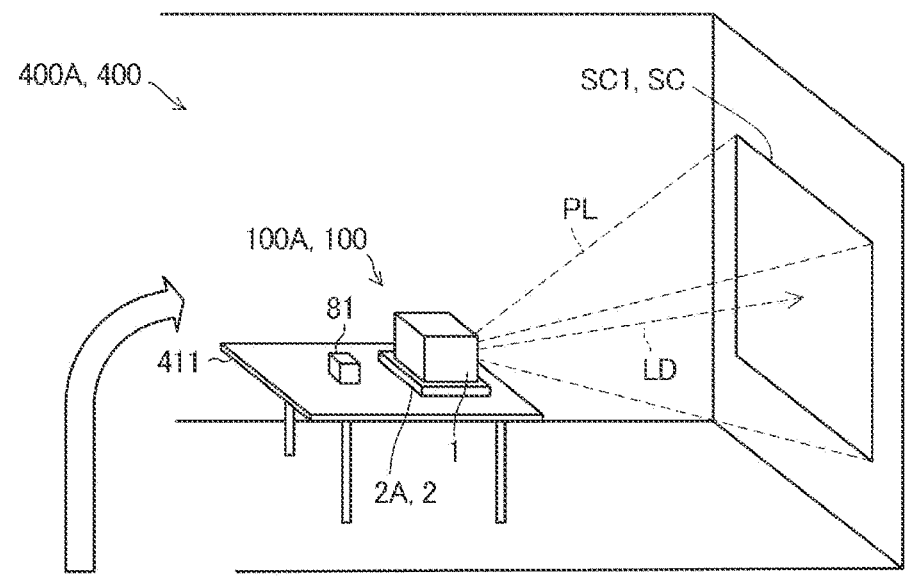
FIG. 4 describes an aspect in which the projection system is used.
Figure 4:
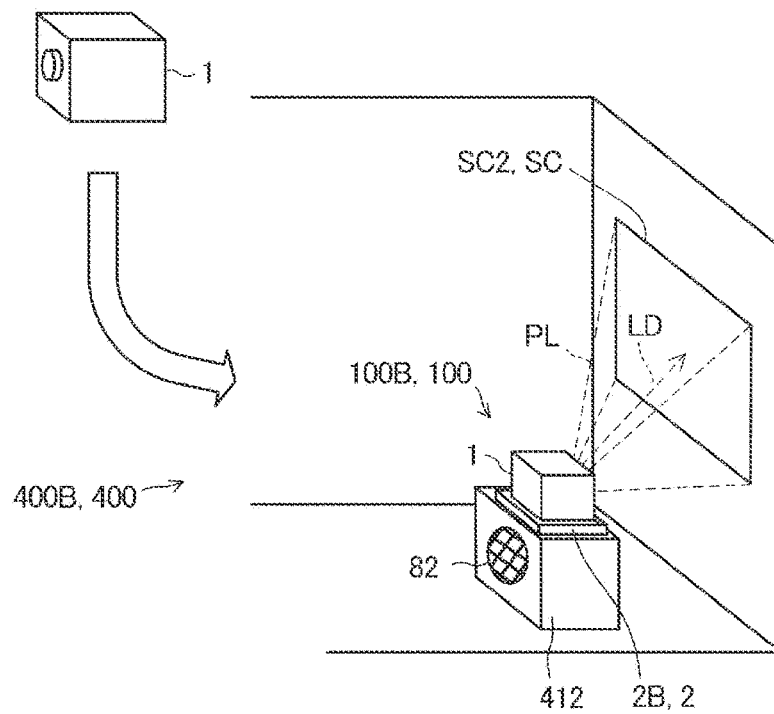

In FIGS. 1 and 4, the latter of which will be described later, the projection direction of the projector 1 is indicated by a reference character LD. The projection direction LD is, for example, the direction of the optical axis of the image light PL that corresponds to the center axis thereof. The action of the shifter 14 can shift the projection direction LD, in which the image light PL is projected, in the upward direction indicated by a reference character UP, the downward direction indicated by a reference character DN, the leftward direction indicated by a reference character L, and the rightward direction indicated by a reference character R.

Shifting the image light PL with the aid of the shifter 14 in accordance with the relative positional relationship between the projection target and the projector 1 allows projection of a high quality image. For example, when the projection target is located in front of the projector 1, the shifter 14 does not need to shift the image light PL. For example, when the projection target is located above the position where the projector 1 is installed, the shifter 14 can shift the image light PL in the direction UP to eliminate the need for geometric correction, or reduce the amount of deformation of the projected image due to geometric correction, whereby a higher quality image can be projected.

1-2. Configuration of Control System of Projection System

Figure 2:
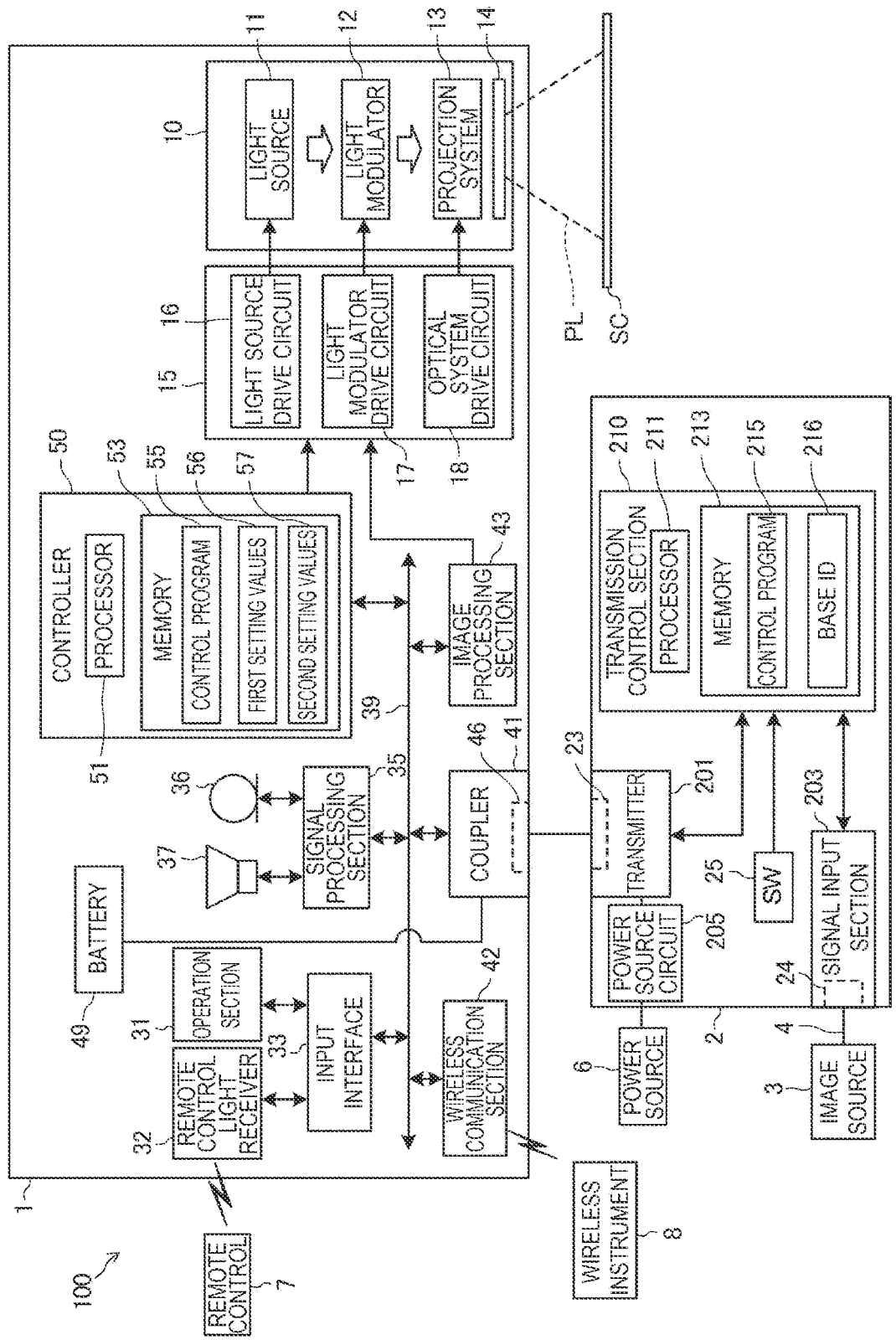
FIG. 2 is a block diagram showing an example of the configuration of a control system of the projection system.

FIG. 2 is a block diagram showing an example of the configuration of a control system of the projection system 100. The projection system 100 includes the projector 1 and the base apparatus 2, as described above. FIG. 2 shows a screen SC as the projection target, on which the projector 1 performs projection, but there is no restriction on the direction in which the projector 1 projects the image light PL or the projection target.

The projector 1 includes a projection apparatus 10, which projects the image light PL, and a drive circuit 15, which drives the projection apparatus 10. The projection apparatus 10 includes a light source section 11, a light modulator 12, and a projection system 13. The drive circuit 15 includes a light source drive circuit 16, a light modulator drive circuit 17, and an optical system drive circuit 18.

The light source 11 is a lamp light source, such as a halogen lamp, a xenon lamp, and an ultrahigh-pressure mercury lamp, or a solid-state light source, such as an LED (light emitting diode) and a laser light source. The light source drive circuit 16 turns on and off the light source 11 under the control of a controller 50. The light source drive circuit 16 adjusts the luminance of the light from the light source 11 under the control of the controller 50.

The light modulator 12 includes light modulation devices that are not shown. The light modulation devices provided in the light modulator 12 include, for example, transmissive liquid crystal panels. The light modulation devices provided in the light modulator 12 may instead be reflective liquid crystal panels or digital micromirror devices (DMDs).

The light emitted by the light source 11 is separated by optical elements that are not shown but are disposed in the optical path between the light source 11 and the light modulator 12 into three kinds of color light, red light, green light, and blue light, which enter the light modulator 12. The light modulation devices of the light modulator 12 modulate the three kinds of light to generate three kinds of image light PL. The three kinds of image light PL are combined with one another by a light combining system, such as a cross dichroic prism, and the combined image light PL exits toward the projection system 13.

The light modulator drive circuit 17 is coupled to an image processing section 43. The light modulator drive circuit 17 drives the light modulator 12 based on image signals generated by the image processing section 43 to draw images on a frame basis at the light modulation devices of the light modulator 12.

The projection system 13 includes a lens, a mirror, and other components that bring the image light PL into focus on the screen SC. The image light PL is projected onto the screen SC via the projection system 13 and forms a projected image on the screen SC. The screen SC corresponds to an example of a projection surface. The projection system 13 includes a zooming mechanism and a focusing mechanism that adjusts the focusing, none of which is shown.

The optical system drive circuit 18 is coupled to the projection system 13. The optical system drive circuit 18 operates the zooming mechanism and the focusing mechanism of the projection system 13, and the shifter 14 under the control of the controller 50.

The projector 1 includes an operation section 31, a remote control light receiver 32, an input interface 33, a signal processing section 35, a microphone 36 a loudspeaker 37, a coupler 41, a wireless communication section 42, the image processing section 43, and the controller 50. The input interface 33, the signal processing section 35, the coupler 41, the wireless communication section 42, the image processing section 43, and the controller 50 are coupled to each other via a bus 39 in a data communicable manner.

The operation section 31 includes a variety of buttons and switches provided at the surface of an enclosure of the projector 1. For example, the operation section 31 includes a switch that instructs start of an audio recognition function. The operation section 31 generates an operation signal corresponding to the operation performed on any of the buttons and switches and outputs the operation signal to the input interface 33. The input interface 33 includes a circuit that outputs the operation signal inputted from the operation section 31 to the controller 50.

The remote control light receiver 32 includes a light receiving device that receives infrared light and receives an infrared signal transmitted from a remote control 7. The remote control 7 transmits an infrared signal representing operation when a switch that is not shown but is provided at the remote control 7 is operated. The remote control light receiver 32 decodes the received infrared signal to generate an operation signal. The remote control light receiver 32 outputs the generated operation signal to the input interface 33. The input interface 33 includes a circuit that outputs the operation signal inputted from the remote control light receiver 32 to the controller 50.

An aspect in which a signal is transmitted from the remote control 7 and received by the remote control light receiver 32 is not limited to a specific aspect. The configuration in which the remote control 7 transmits the infrared signal to the remote control light receiver 32 is presented by way of example. For example, the remote control 7 and the remote control light receiver 32 may be configured to transmit and receive a signal by performing short-range wireless communication such as Bluetooth. In this case, the remote control light receiver 32 may be replaced with a communication processing circuit that performs short-range wireless communication such as Bluetooth. Bluetooth is a registered trademark.

The signal processing section 35 is coupled to the microphone 36 and the loudspeaker 37. The microphone 36 collects sound from the space outside the enclosure of the projector 1. The signal processing section 35 converts the audio collected by the microphone 36 into digital audio data and outputs the data to the controller 50. The signal processing section 35 drives the loudspeaker 37 based on the digital audio data inputted from the controller 50 to cause the loudspeaker 37 to output audio.

The signal processing section 35 may include a digital-to-analog conversion circuit that converts the digital audio data into an analog audio signal. The signal processing section 35 may include an amplifier that amplifies the analog audio signal.

The coupler 41 is an interface apparatus including the coupling terminals 46 and an interface circuit that transmits and receives image signals via the coupling terminals 46. The coupler 41 receives signals outputted by the base apparatus 2 with the coupling terminals 23 and 46 electrically continuous with each other. The signals outputted by the base apparatus 2 include image signals and control signals. The image signals outputted by the base apparatus 2 may be signals accompanied by or including audio signals. The coupler 41 further transmits control signals to the base apparatus 2 under the control of the controller 50.

The wireless communication section 42 is a communication apparatus that performs wireless communication. The wireless communication section 42 includes, for example, an antenna, an RF (radio frequency) circuit, and a baseband circuit. The wireless communication section 42 transmits and receives image signals, audio signals, other control signals, and the like via the wireless communication. The wireless communication section 42 performs, for example, WirelessHD, MIracast, Wi-Fi, Bluetooth, and other types of communication. WirelessHD, MIracast, and Wi-Fi are registered trademarks.

The wireless communication section 42 performs the wireless communication, for example, with a wireless instrument 8. There are no restrictions on the type of the wireless instrument 8. For example, the wireless instrument 8 may be a loudspeaker that receives an audio signal from the projector 1 over Bluetooth communication. The wireless instrument 8 may instead be an image supplier that wirelessly transmits an image signal to the projector 1.

The image processing section 43 selects an image source under the control of the controller 50. Examples of the source available to the projector 1 may include image signals received by the coupler 41, image signals received by the wireless communication section 42, and image data stored in a memory 53.

The image processing section 43 acquires image data from the selected source and performs image processing on the image data. The image processing performed by the image processing section 43 includes, for example, resolution conversion, geometric correction, digital zooming, and image correction for adjustment of the hue and brightness of an image. As an example, the image processing section 43 in the present embodiment performs at least geometric correction. The image processing section 43 performs geometric correction on an image to be projected by the projection apparatus 10 in accordance with a correction parameter inputted from the controller 50.

The image processing section 43 generates an image signal based on the image data having undergone the image processing and outputs the image signal to the light modulator drive circuit 17. A frame memory that is not shown may be coupled to the image processing section 43. The frame memory is formed, for example, of an SDRAM (synchronous dynamic random access memory). In this case, the image processing section 43 loads image data acquired from the source in the frame memory. The image processing section 43 performs the image processing on the image data loaded in the frame memory.

The image processing section 43 can be formed, for example, of an integrated circuit. The integrated circuit is based, for example, on LSI (large scale integration). More specifically, the image processing section 43 is formed, for example, of an ASIC (application specific integrated circuit) or a PLC (programmable logic device). The PLD includes, for example, an FPGA (field-programmable gate array). An analog circuit may form part of the configuration of the integrated circuit, or the combination of a processor and an integrated circuit may be used. The combination of a processor and an integrated circuit is called, for example, a microcontroller (MCU), a SoC (System-on-a-chip), a system LSI, and a chipset.

The projector 1 includes a battery 49. The battery 49 has a built-in secondary battery, such as a lithium ion battery or a metal hydride battery, and supplies each portion of the projector 1 with electric power from the secondary battery. The projector 1 includes a charging connector that is not shown and charges the battery 49 with electric power externally inputted via the charging connector. The projector 1 can use the electric power from the battery 49 to operate the portions of the projector 1 including the projection apparatus 10, the drive circuit 15, the wireless communication section 42, the image processing unit 43, and the controller 50. Specifically, the projector 1 can project the image light PL by using the electric power charged in the battery 49.

The battery 49 is coupled to the coupler 41. With the base apparatus 2 coupled to the coupler 41, the coupler 41 receives electric power supplied from the base apparatus 2 and supplies the battery 49 with the electric power for charging. Specifically, some of the terminals of the coupler 41 are power feeding terminals that supply the projector 1 with the electric power from the base apparatus 2, and the coupler 41 charges the battery 49 with the electric power supplied via those of the coupling terminals 46.

The controller 50 includes a processor 51 and the memory 53. The memory 53 is a storage apparatus that stores in a nonvolatile manner a program executed by the processor 51 and data processed by the processor 51. The memory 53 is formed of a magnetic storage apparatus, a semiconductor storage element such as a flash ROM (read only memory), or any other type of nonvolatile storage apparatus. The memory 53 may include a RAM (random access memory) that forms a work area for the processor 51. The memory 53 stores data to be processed by the controller 50 and a control program 55 executed by the processor 51.

The processor 51 is formed, for example, of a CPU (central processing unit) or an MPU (micro-processing unit). The processor 51 may be formed of a single processor, or a plurality of processors may function as the processor 51. The processor 51 may be formed of an SoC integrated with part or entirety of the memory 53 and/or another circuit. The processor 51 may instead be formed of the combination of a CPU that executes a program and a DSP (digital signal processor) that performs predetermined arithmetic processing, as described above. The entire functions of the processor 51 may be implemented in hardware or may be achieved by using a programmable device. The processor 51 may also provide the function of the image processing section 43. That is, the function of the image processing section 43 may be performed by the processor 51.

The processor 51 controls the portions of the projector 1 by executing the control program 55 stored in the memory 53.

The processor 51 causes the image processing section 43 to select a source, and causes the image processing section 43 to acquire image data from the selected source. The processor 51 controls the drive circuit 15 to cause the projection apparatus 10 to project the image light PL to display an image based on the image signal outputted by the image processing section 43.

The memory 53 stores, for example, image data. When the image processing section 43 selects the image data in the memory 53 as the source, an image based on the image data stored in the memory 53 is projected by the projection apparatus 10.

The memory 53 stores first setting values 56 and second setting values 57. The first setting values 56 include a variety of setting values used with the base apparatus 2 coupled to the coupler 41. The second setting values 57 include a variety of setting values used with the projector 1 separated from the base apparatus 2. The memory 53 corresponds to an example of a first storage section.

When the coupling terminals 23 of the base apparatus 2 are electrically coupled to the coupler 41, the processor 51 causes the coupler 41 to receive an image signal via wired communication.

The processor 51 monitors whether or not the base apparatus 2 is coupled to the coupler 41 from the state in which the base apparatus 2 is not coupled to the coupler 41, that is, with the projector 1 is not attached to the base apparatus 2. When the processor 51 detects that the base apparatus 2 has been coupled to the coupler 41, the processor 51 sets a variety of settings, including the projection apparatus 10, of the projector 1 by using the setting values in the first setting values 56.

The processor 51 monitors whether or not the base apparatus 2 is separated from the coupler 41 from the state in which the base apparatus 2 is coupled to the coupler 41, that is, with the projector 1 is attached to the base apparatus 2. When the processor 51 detects that the base apparatus 2 has been separated from the coupler 41, the processor 51 sets the variety of settings, including the projection apparatus 10, of the projector 1 by using the setting values in the second setting values 57.

Figure 3:
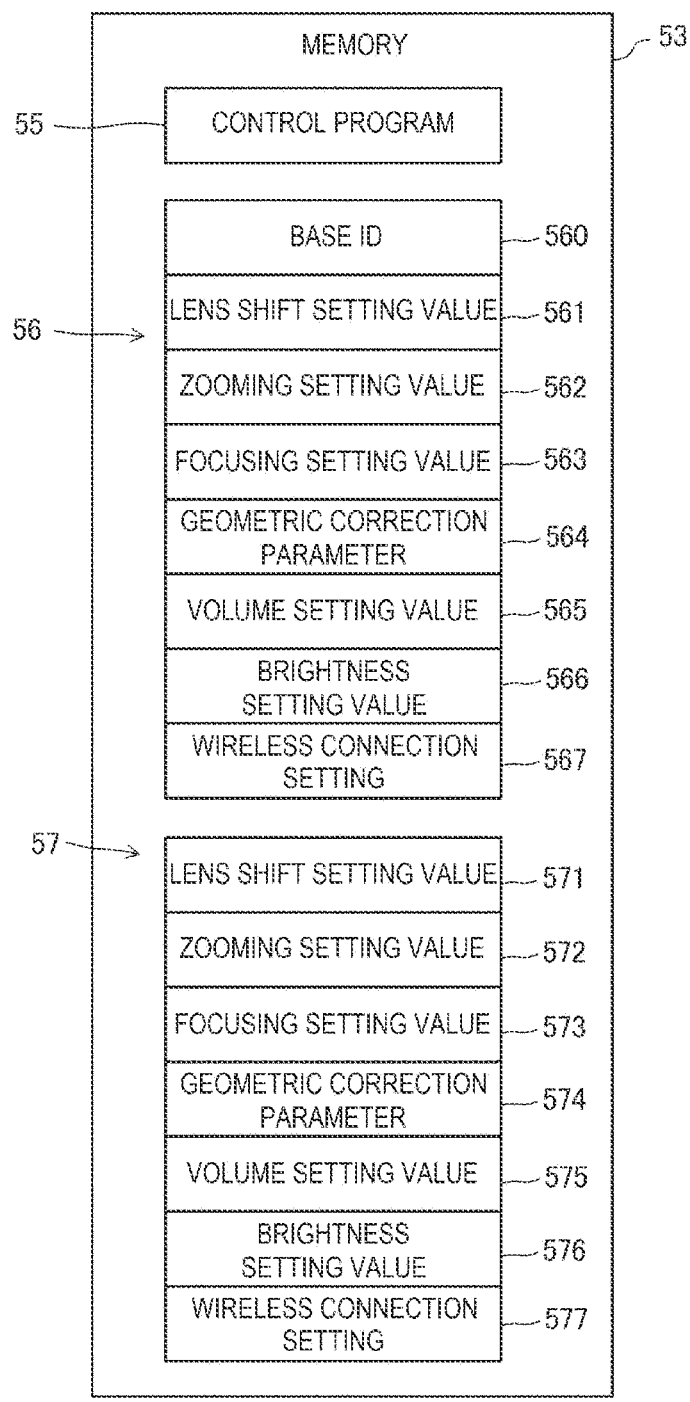
FIG. 3 is a diagrammatic view showing an example of the configuration of data stored in a memory.

FIG. 3 is a diagrammatic view showing an example of the configuration of the data stored in the memory 53.

The first setting values 56 include a base ID 560, a lens shift setting value 561, a zooming setting value 562, a focusing setting value 563, a geometric correction parameter 564, a volume setting value 565, a brightness setting value 566, and a wireless connection setting 567. The base ID 560 is identification information that identifies the base apparatus 2 and is assigned to each individual base apparatus 2 in advance.

The second setting values 57 include a lens shift setting value 571, a zooming setting value 572, a focusing setting value 573, a geometric correction parameter 574, a volume setting value 575, a brightness setting value 576, and a wireless connection setting 577. The lens shift setting values 561 and 571 include setting values of the same type. The setting value included in the lens shift setting value 561 and the setting value included in the lens shift setting value 571 may be the same or different from each other. The same holds true for the zooming setting values 562 and 572, the focusing setting values 563 and 573, and the geometric correction parameters 564 and 574. The same also holds true for the volume setting values 565 and 575. The same further holds true for the brightness setting values 566 and 576 and the wireless connection settings 567 and 577.

The lens shift setting values 561 and 571 are setting values that specify the position to which the projection direction LD is shifted by the shifter 14. The processor 51 causes the shifter 14 to act by controlling the optical system drive circuit 18 based on the lens shift setting value 561 or 571. The shifter 14 thus shifts the projection direction LD in the direction specified by the lens shift setting value 561 or 571 by the amount specified by the lens shift setting value 561 or 571.

The zooming setting values 562 and 572 are setting values that specify the state of the zooming mechanism of the projection system 13. The processor 51 causes the zooming mechanism to act by controlling the optical system drive circuit 18 based on the zooming setting value 562 or 572. The zooming mechanism thus enlarges or reduces the image light PL at the magnification specified by the zooming setting value 562 or 572.

The focusing setting values 563 and 573 are setting values that specify the state of the focusing mechanism of the projection system 13. The processor 51 causes the focusing mechanism to act by controlling the optical system drive circuit 18 based on the focusing setting value 563 or 573. The focusing mechanism thus adjusts the focus of the image light PL in accordance with the focusing setting value 563 or 573.

The geometric correction parameters 564 and 574 each include a parameter of the geometric correction performed by the image processing section 43. The processor 51 sets the geometric correction parameter 564 or 574 in the image processing section 43. The image processing section 43 performs the geometric correction in accordance with the geometric correction parameter 564 or 574 set by the processor 51.

The first setting values 56 include one or more of the lens shift setting value 561, the zooming setting value 562, the focusing setting value 563, and the geometric correction parameter 564. The second setting values 57 include one or more of the lens shift setting value 571, the zooming setting value 572, the focusing setting value 573, and ole geometric correction parameter 574.

The first setting values 56 may or may not include the volume setting value 565, the brightness setting value 566, or the wireless connection setting 567. In this case, the second setting values 57 may or may not include the volume setting value 575, the brightness setting value 576, or the wireless connection setting 577.

The volume setting values 565 and 575 are setting values that specify the volume of the audio outputted by the projector 1. The volume setting values 565 and 575 are used when the projector 1 outputs audio via the loudspeaker 37 or when the wireless instrument 8 wirelessly connected to the wireless communication section 42 is a loudspeaker and the wireless instrument 8 outputs audio. The processor 51 controls the signal processing section 35 based on the volume setting value 565 or 575 to set the output volume of the loudspeaker 37 at the volume specified by the volume setting value 565 or 575. When the wireless instrument 8 wirelessly connected to the wireless communication section 42 is a loudspeaker, the processor 51 transmits a control signal from the wireless communication section 42 to the wireless instrument 8 based on the volume setting value 565 or 575, and causes the wireless instrument 8 to output audio at the volume specified by the volume setting value 565 or 575.

The brightness setting values 566 and 576 are setting values that specify the brightness of an image projected by the projection apparatus 10. The processor 51 controls the light source drive circuit 16 based on the brightness setting value 566 or 576 to adjust the amount of the image light PL in such a way that the projected image has the brightness specified by the brightness setting value 566 or 576.

The wireless connection settings 567 and 577 include setting values relating to the function of connecting the wireless communication section 42 to the wireless instrument 8 via wireless communication. The wireless connection setting 567 sets the action of the wireless communication section 42 in the state in which the projector 1 is coupled to the base apparatus 2. The wireless connection setting 577 sets the action of the wireless communication section 42 in the state in which the projector 1 is not coupled to the base apparatus 2. For example, the wireless connection settings 567 and 577 specify whether or not the wireless communication section 42 is allowed to be connected to the wireless instruments 8, identification information that identifies the wireless instrument 8 to which the wireless communication section 42 is allowed to be connected, and the type of the wireless instrument 8 to which the wireless communication section 42 is allowed to be connected. The wireless connection settings 567 and 577 further include, for example, the number of wireless instruments 8 to which the wireless communication section 42 is connected.

The identification information that identifies the wireless instrument 8 contained in the wireless connection settings 567 and 577 may be information that allows identification of an individual wireless instrument 8. Examples of the identification information that identifies the wireless instrument 8 may include a Bluetooth ID and a device ID.

The set of first setting values 56 is associated with the base ID 560. The memory 53 may be configured to store a plurality of sets of first setting values 56. In this case, the plurality of sets of first setting values 56 each include a unique base ID 560 different from the others. When the processor 51 detects that the base apparatus 2 has been coupled to the coupler 41, the processor 51 acquires the base ID of the base apparatus 2 and selects the set of first setting values 56 including the acquired base ID. The processor 51 sets the portions, including the projection apparatus 10, of the projector 1 based on the selected set of first setting values 56.

The plurality of sets of first setting values 56 stored by the memory 53 include setting values of the same type. The setting values included in the plurality sets of first setting values 56 may be the same value or different values, with the exception of the base ID 560.

In the state in which the base apparatus 2 is coupled to the projector 1, the processor 51 sets the first setting values 56 in the portions of the projector 1 and causes the projection apparatus 10 to project an image. In the state in which the base apparatus 2 is not coupled to the projector 1, the processor 51 sets the second setting values 57 stored by the memory 53 in the portions of the projector 1 and causes the projection apparatus 10 to project an image.

FIG. 4 describes an aspect in which the projection system 100 is used and shows an example of an installation room 400, where the projection system 100 is used.

FIG. 4 shows two specific examples of the installation room 400: an installation room 400A, where a base apparatus 2A is installed; and an installation room 400B, where a base apparatus 2B is installed. The base apparatuses 2A and 2B are examples of the base apparatus 2.

A screen SC1 is installed at one wall surface of the installation room 400A. In the installation room 400A, a desk 411 is installed in a position where the desk 411 directly faces the screen SC1, and the base apparatus 1A is fixed to the upper surface of the desk 411. The base apparatus 2A may be fixed to the desk 411 in an immobile manner or may be placed on the desk 411.

A screen SC2 is installed at one wall surface of the installation room 400B. In the installation room 400B, a cabinet 412 is installed in a position where the cabinet 412 directly faces the screen SC2, and the base apparatus 2B is fixed to the upper surface of the cabinet 412. The base apparatus 2B may be fixed to the cabinet 412 in an immobile manner or may be placed on the cabinet 412.

The base apparatus 2 specifies the direction in which the projector 1 projects the image light PL and the position where the projector 1 is installed, as shown in FIG. 1.

Now, a case where the projector 1 is installed in the installation room 400A and the projector 1 projects the image light PL onto the screen SC1 is compared with a case where the projector 1 is installed in the installation room 400B and the projector 1 projects the image light PL onto the screen SC2. The distance between the screen SC1 and the desk 411 is longer than the distance between the screen SC2 and the cabinet 412. The height of the desk 411 differs from the height of the cabinet 412.

When the projector 1 is installed at the base apparatus 2A, the projection apparatus 10 is preferably set in accordance with the distance between the base apparatus 2A and the screen SC1 in the installation room 400A, the relative height relationship between the base apparatus 2A and the screen SC1, the size of the installation room 400A, and other factors. Specifically, a high quality image can be projected onto screen SC1 by appropriately setting the setting value of the shifter 14, and the zooming setting, the focusing setting, the geometric correction parameter, and the brightness of the image light PL in the projection apparatus 10. The same holds true for the installation room 400B.

In the projector 1 according to the present embodiment, the first setting values 56 suitable for the installation room 400A and the first setting values 56 suitable for the installation room 400B are stored in the memory 53. The first setting values 56 suitable for the installation room 400A include setting values adapted to the position where the base apparatus 2A is installed in correspondence with the base ID 560 of the base apparatus 2A. The setting values specifically include the lens shift setting value 561, the zooming setting value 562, the focusing setting value 563, the geometric correction parameter 564, and the brightness setting value 566. The first setting values 56 suitable for the installation room 400B include the variety of setting values in association with the base ID 560 of the base apparatus 2B.

When the projector 1 is coupled to the base apparatus 2A, the processor 51 sets the setting values in the first setting values 56 associated with the base ID 560 of the base apparatus 2A in the projector 1. The projector 1 can thus operate the projection apparatus 10 at the settings suitable for the relative positional relationship between the projector 1 and the screen SC1 in the installation room 400A to project a high quality image. The same holds true for the case where the projector 1 is coupled to the base apparatus 2B.

A loudspeaker 81 is installed in the installation room 400A. A loudspeaker 82 is installed in the installation room 400B. The loudspeakers 81 and 82 are examples of the wireless instrument 8. The wireless connection setting 567 associated with the base apparatus 2A contains information that allows the wireless communication section 42 to couple the projector 1 to the loudspeaker 81. The wireless connection setting 567 associated with the base apparatus 2B contains information that allows the wireless communication section 42 to couple the projector 1 to the loudspeaker 82.

When the projector 1 is coupled to the base apparatus 2A, the processor 51 couples the wireless communication section 42 to the loudspeaker 81 based on the wireless connection setting 567 associated with the base ID 560 of the base apparatus 2A. The projector 1 can thus be wirelessly connected to the loudspeaker 81 via the wireless communication section 42 and output audio from the loudspeaker 81 by transmitting audio data to the loudspeaker 81. The volume of the audio outputted by the loudspeaker 81 is set based on the volume setting value 565. The projector 1 can therefore output audio at a predetermined volume from the loudspeaker 81 by causing the processor 51 to set the wireless communication section 42 based on the volume setting value 565 and the wireless connection setting 567. When the projector 1 is coupled to the base apparatus 2B, the processor 51 couples the wireless communication section 42 to the loudspeaker 82 by using the volume setting value 565 and the wireless connection setting 567 associated with the base ID 560 of the base apparatus 2B.

Returning back to FIG. 2, the base apparatus 2 includes a first transmitter 201, a signal input section 203, a power source circuit 205, and a transmission control section 210.

The first transmitter 201 is an interface apparatus including the coupling terminals 23 and an interface circuit that transmits and receives image signals via the coupling terminals 23. The first transmitter section 201 transmits an image signal to the projector 1 with the coupling terminals 23 and 46 electrically continuous with each other.

The first transmitter 201 is coupled to the power source circuit 205. The power source circuit 205 is coupled to a power source 6 external to the base apparatus 2. The power source circuit 205 outputs a DC current having a predetermined voltage to the first transmitter 201 based on the electric power supplied from the power source 6. The first transmitter 201 outputs the current inputted from the power source circuit 205 to the coupler 41 via the coupling terminals 23 under the control of the transmission control section 210.

The power source 6 is, for example, a commercial AC power source. In this case, the power source circuit 205 may be configured to include a conversion circuit or a voltage conversion circuit that converts an AC current to a DC current having a predetermined voltage. The power source 6 may instead be an AC adapter that converts commercial AC electric power into a DC current having a predetermined voltage and outputs the converted DC current. In this case, the power source circuit 205 may be configured to include no conversion circuit that converts an AC current into a DC current having a predetermined voltage.

The signal input section 203 is an interface apparatus including the connector 24 and an interface circuit that receives an image signal via the connector 24. The signal input section 203 receives the image signal outputted by the image source 3 through the cable 4 via the connector 24. The image signal transmitted by the image source 3 does not necessarily have a specific signal format, may have a signal format compliant with any of the variety of standards described above or a non-standardized signal format. The image signal transmitted by the image source 3 may include an audio signal.

The transmission control section 210 is coupled to the first transmitter 201 and the signal input section 203.

The transmission control section 210 includes a processor 211 and a memory 213. The memory 213 is a storage apparatus that stores in a nonvolatile manner a program executed by the processor 211 and data processed by the processor 211. The memory 213 is formed of a magnetic storage apparatus, a semiconductor storage element, such as a flash ROM, or any other nonvolatile storage apparatus. The memory 213 may include a RAM that forms a work area used by the processor 211. The memory 213 stores data to be processed by the transmission control section 210 and a control program 215 executed by the processor 211.

The processor 211 is formed, for example, of a CPU, an MPU, or a microcomputer. The processor 211 may be formed of a single processor, or a plurality of processors may function as the processor 211. The processor 211 may be formed of an SoC integrated with part or entirety of the memory 213 and/or another circuit. Furthermore, the entire functions of the processor 211 may be implemented in hardware or may be achieved by using a programmable device.

The processor 211 controls each portion of the base apparatus 2 by executing the control program 215 stored in the memory 213.

The processor 211 receives the image signal from the signal input section 203 and generates an image signal to be transmitted to the projector 1 based on the received image signal. The image signal transmitted by the base apparatus 2 to the projector 1 may be the same as the image signal received from the image source 3. The processor 211 may generate the image signal to be transmitted to the projector 1 by converting the frame frequency, the resolution, and the transmission rate of the image signal received from the image source 3.

When the coupling terminals 23 are wired to the coupling terminals 46, the processor 211 controls the first transmitter 201 to couple the coupler 41 of the projector 1 to the first transmitter 201. The processor 211 controls the first transmitter 201 to cause the first transmitter 201 to output the image signal to the projector 1.

The switch 25 is coupled to the transmission control section 210. The switch 25 is turned on when the projector 1 is coupled to the base apparatus 2 and turned off when the projector 1 is separated from the base apparatus 2. The processor 211 detects that the projector 1 has been coupled to the base apparatus 2 and that the projector 1 has been separated from the base apparatus 2 based on the state of the switch 25.

At least one of the projector 1 and the base apparatus 2 can sense that the projector 1 and the base apparatus 2 have been coupled to each other and that the projector 1 and the base apparatus 2 have been separated from each other.

Specific aspects in which the projector 1 detects that the projector 1 and the base apparatus 2 have been coupled to each other and that the projector 1 and the base apparatus 2 have been separated from each other may include Specific Examples 1 to 4.

Specific Example 1: When an image signal, a control signal, or any other signal is inputted to the coupler 41, the processor 51 detects that the base apparatus 2 has been coupled to the coupler 41. When the signal being inputted to the coupler 41 is disrupted, the processor 51 detects that the coupler 41 and the base apparatus 2 has been decoupled from each other, that is, the projector 1 is separated from the base apparatus 2. In detail, when the electric signal being inputted to the coupling terminals 46 of the coupler 41 stops and the period for which the electric signal stops becomes longer than a predetermined period or a timeout occurs, the processor 51 detects that the wired coupling has been decoupled. In this case, when the electric signal being inputted to the coupling terminals 46 of the coupler 41 stops and the period for which the electric signal stops becomes longer than the predetermined period or a timeout occurs, the processor 51 detects that the wired coupling has been decoupled.

Specific Example 2: The processor 51 monitors the electrical continuity between the coupling terminals 23 and 46. When the coupling terminals 23 and 46 are electrically coupled to each other, the processor 51 detects that the base apparatus 2 has been coupled to the coupler 41. When the processor 51 detects that the electrical continuity between the coupler 41 and the coupling terminals 23 has been disrupted, the processor 51 detects that the projector 1 has been separated from the base apparatus 2. Employing the approach described above and further employing, for example, a configuration in which the coupling terminals 23 and 46 are provided with contacts for checking electrical continuity allows the processor 51 to sense the disruption of the wired coupling more readily.

Specific Example 3: When the electric power supplying to the coupler 41 starts, the processor 51 detects that the base apparatus 2 has been coupled to the coupler 41. When the electric power supplying to the coupler 41 is disrupted, the processor 51 detects that the projector 1 has been separated from the base apparatus 2.

Specific Example 4: The projector 1 is configured to sense physical separation of the protrusion 22 of the base apparatus 2 from the recess 45 of the projector 1. Specifically, a sensor that detects engagement with the protrusion 22 is provided in the recess 45. The sensor is, for example, a switch-type sensor similar to the switch 25, or an optical or magnetic sensor that detects the proximity of the protrusion 22 to the projector 1. The processor 51 detects that the projector 1 has been coupled to the base apparatus 2 and that the projector 1 has been separated from the base apparatus 2 based on the value detected by the sensor.

Instead of the above, for example, a user may operate the operation section 31 or the remote control 7 to inform the projector 1 that the projector 1 has been attached to the base apparatus 2. In this case, the projector 1 accepts the operation via the operation section 31 or the remote control 7 and can therefore quickly sense that the projector 1 has been attached to the base apparatus 2. In this case, at least one of the operation section 31 and the remote control 7 corresponds to an example of an operation section.

Specific aspects in which the base apparatus 2 detects that the projector 1 and the base apparatus 2 have been coupled to each other and that the projector 1 and the base apparatus 2 have been separated from each other may include Specific Examples 5 to 8.

Specific Example 5: The processor 211 detects that the projector 1 has been separated from the base apparatus 2 based on whether or not there is a response to the transmission of an image signal from the first transmitter 201. For example, when the first transmitter 201 transmits an image signal, the projector 1 transmits a response to the first transmitter 201 in a frame cycle or a packet cycle, or at any other timing. When the electrical signal being inputted from the projector 1 to the coupling terminals 23 stops and the period for which the electrical signal stops becomes longer than a predetermined period or a timeout occurs, the processor 211 detects that the projector 1 has been separated from the base apparatus 2.

Specific Example 6: The processor 211 monitors the electrical continuity between the coupling terminals 23 and 46. When the coupling terminals 23 and 46 are electrically coupled to each other, the processor 211 detects that the base apparatus 2 has been coupled to the coupler 41. When the processor 211 detects that the electrical continuity between the coupler 41 and the coupling terminals 23 has been disrupted, the processor 211 detects that the projector 1 has been separated from the base apparatus 2. Employing the approach described above and further employing, for example, the configuration in which the coupling terminals 23 and 46 are provided with contacts for checking electrical continuity allows the processor 211 to sense the disruption of the wired coupling more readily.

Specific Example 7: The processor 211 detects that the projector 1 has been coupled to the base apparatus 2 and the projector 1 has been separated from the base apparatus 2 based on the state of a load coupled to a terminal, out of the coupling terminals 23, to which electric power is supplied from the first transmitter 201.

Specific Example 8: The processor 211 detects that the projector 1 has been coupled to the base apparatus 2 and the projector 1 has been separated from the base apparatus 2 based on the state of the switch 25.

The memory 213 provided an the base apparatus 2 stores a base ID 216. The base ID 216 is an identification information that allows identification of an individual base apparatus 2. When the projector 1 is coupled to the base apparatus 2, the processor 211 transmits the base ID 216 to the projector 1 via the first transmitter 201.

In the first embodiment and a second embodiment, the latter of which will be described later, the base apparatus 2 detects that the projector 1 has been coupled to the base apparatus 2. The case where the base apparatus 2 performs the action in Specific Example 8 described above will be described by way of example, but any of the methods in Specific Examples 5 to 7 is also applicable. In a third embodiment, which will be described later, the projector 1 detects that the projector 1 has been coupled to the base apparatus 2. The specific configuration in this case may be any of the configurations in Specific Examples 1 to 4 described above. In the first to third embodiments, the projector 1 and the base apparatus 2 mutually sense that the projector 1 has been separated from the base apparatus 2. The specific configuration in this case may be any of the configurations in Specific Examples 1 to 8 described above.

1-3. Action of Projection System

Figure 5:
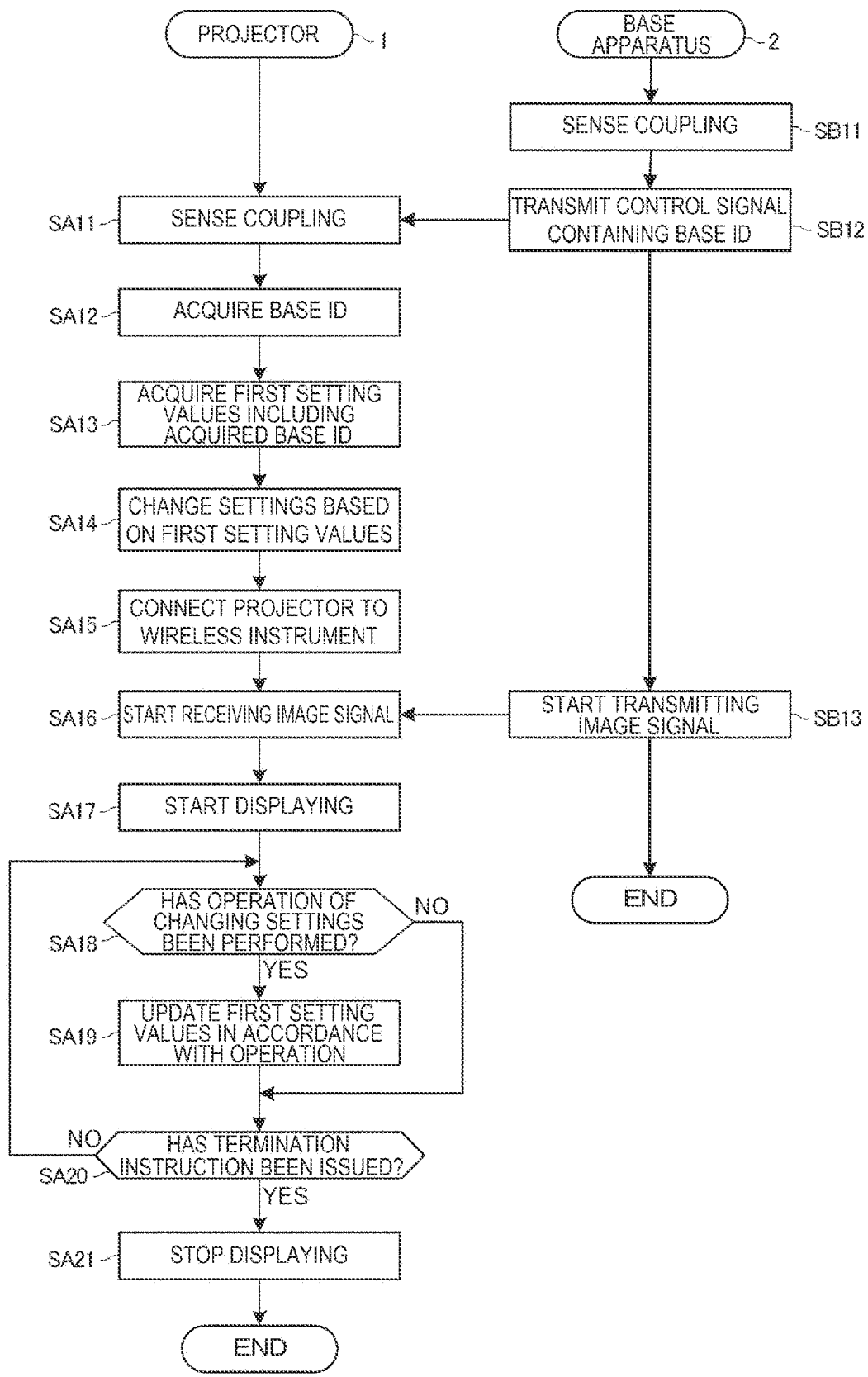
FIG. 5 is a sequence diagram showing the action of the projection system according to the first embodiment.
Figure 6:
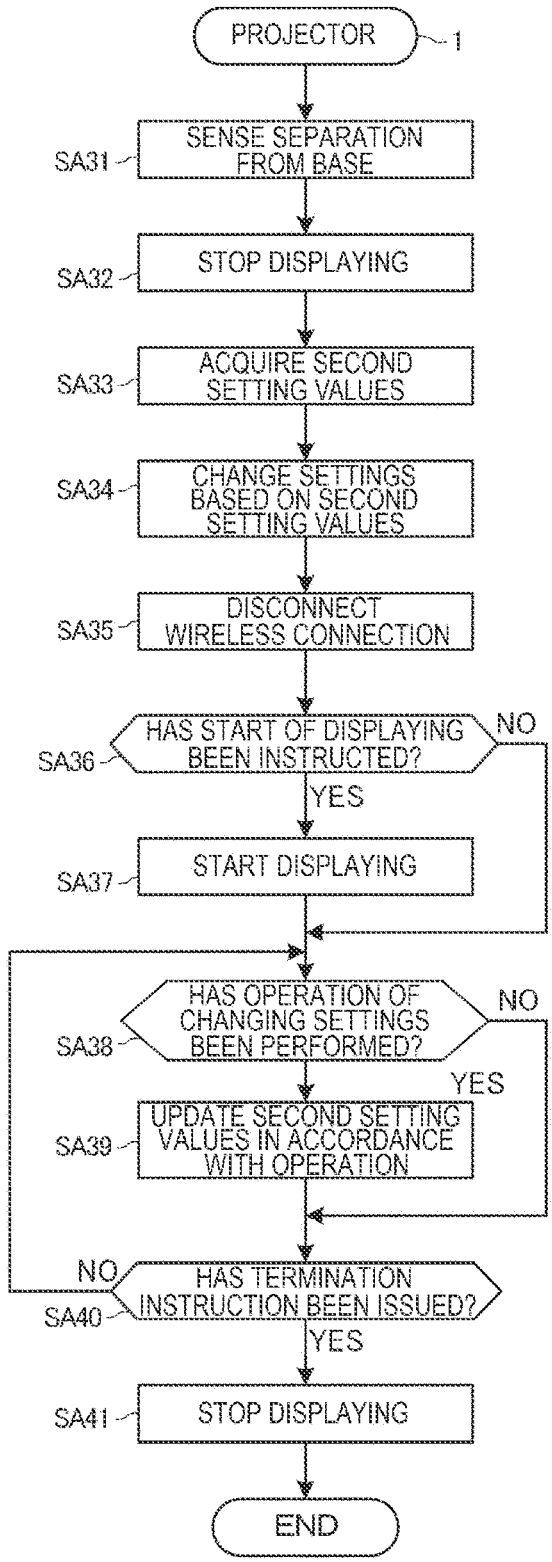
FIG. 6 is a flowchart showing the action of the projector according to the first embodiment.

FIG. 5 is a sequence diagram showing the action of the projection system 100. FIG. 6 is a flowchart showing the action of the projector 1. The action of the projection system 100 will be described with reference to FIGS. 5 and 6. The action shown in FIG. 5 is the action performed when the projector 1 is not attached to the base apparatus 2 and the projector 1 is then attached to the base apparatus 2. In FIG. 5, the controller 50 carries out the processes in steps SA11 to SA21, and the transmission control section 210 carries out the processes in steps SB11 to SB13.

In step SB11, the base apparatus 2 detects that the projector 1 is coupled thereto. A specific detecting method in step SB11 can be any of those in Specific Examples 5 to 8 described above. In step SB12, the base apparatus 2 transmits a control signal containing the base ID 216 to the projector 1 from the first transmitter 201.

In step SA11, the projector 1 receives the control signal transmitted by the base apparatus 2 to sense that the projector 1 has been coupled to the base apparatus 2. In step SA12, the projector 1 acquires the base ID contained in the control signal transmitted by the base apparatus 2. In step SA11, the projector 1 may sense that the projector 1 has been coupled to the base apparatus 2 by executing any of the methods in Specific Examples 1 to 4 described above.

In step SA13, the projector 1 acquires from the memory 53 the first setting values 56 including the base ID acquired in step SA12. That is, the projector 1 acquires the setting values associated with the base ID acquired in step SA12.

In step SA14, the projector 1 changes the settings of the portions thereof including the projection apparatus 10 based on the first setting values 56 acquired in step SA13.

In step SA15, the projector 1 is coupled to the wireless instrument 8 via the wireless communication section 42 in accordance with the wireless connection setting 567 included in the first setting values 56 acquired in step SA13.

In step SB13, the base apparatus 2 starts transmitting an image signal to the projector 1 via the coupler 41. The image signal transmitted by the base apparatus 2 may be a signal containing or accompanied by an audio signal.

In step SA16, the projector 1 starts receiving the image signal transmitted by the base apparatus 2. In step SA17, the projector 1 starts displaying based on the image signal received from the base apparatus 2. In a case where the projector 1 receives an audio signal from the base apparatus 2, the projector 1 starts outputting audio in step SA17.

In step SA18, the projector 1 evaluates whether or not the operation of instructing a change in the settings relating to the action of the projector 1 has been performed, for example, via the operation section 31 or the remote control 7. When the operation of instructing a change in the settings is performed (YES in step SA18), the projector 1 transitions to step SA19 to update the first setting values 56 in accordance with the operation. The projector 1 then transitions to step SA20 to evaluate whether or not the operation section 31, the remote control 7, or any other component has been operated to instruct termination of the displaying. When no instruction of termination of the displaying has been issued (NO in step SA20), the projector 1 returns to step SA18. When the instruction of termination of the displaying has been issued (YES in step SA20), the projector 1 transitions to step SA21 to terminate the displaying and end the present procedure. In the case where the projector 1 has started outputting audio in step SA17, the projector 1 stops outputting the audio in step SA21. When the projector determines in step SA18 that no operation of instructing a change in the settings has been performed (NO in step SA18), the projector 1 does not execute step SA19 but transitions to step SA20.

The action shown in FIG. 6 is the action of the projector 1 performed when the projector 1 is attached to the base apparatus 2 and the projector 1 is then separated from the base apparatus 2. The processes in steps SA31 to SA41 in FIG. 6 are carried out by the controller 50.

In step SA31, the projector 1 detects that the projector 1 has been separated from the base apparatus 2. How the projector 1 specifically detects its separation from the base apparatus 2 can be any of the methods described in Specific Examples 1 to 4 described above.

The projector 1 transitions to step SA32 to stop the displaying performed by the projection apparatus 10. In step SA33, the projector 1 acquires the second setting values 57 stored by the memory 53 and transitions to step SA34 to change the settings of the portions of the projector 1 based on the second setting values 57. The process in step SA34 changes the settings of the projection apparatus 10 and the image processing section 43 to the settings according to the second setting values 57.

In step SA35, the projector 1 disconnects the connection to the wireless instrument 8 connected based on the wireless connection setting 567.

The projector then evaluates in step SA36 whether or not the operation section 31 or the remote control 7 has been operated to instruct start of the displaying. When the start of the displaying is instructed (YES in step SA36), the projector 1 transitions to step SA37 to start the displaying performed by the projection apparatus 10 and transitions to step SA38. In step SA37, the projector 1 displays an image based, for example, on the image data stored in the memory 53. In step SA37, the projector 1 may start outputting audio while starting the displaying.

When the start of the displaying has not been instructed (NO in step SA36), the projector 1 transitions to step SA38.

In step SA38, the projector 1 evaluates whether or not the operation of instructing a change in the settings relating to the action of the projector 1 has been performed, for example, via the operation section 31 or the remote control 7. When the operation of instructing a change in the settings has been performed (YES in step SA38), the projector 1 transitions to step SA39 to update the second setting values 57 in accordance with the operation. The projector 1 then transitions to step SA40 to evaluate whether the operation section 31, the remote control 7, or any other component has been operated to instruct termination of the displaying. When termination of the displaying has not been instructed (NO in step SA40), the projector 1 returns to step SA38. When termination of the displaying has been in (YES in step SA40), the projector 1 transitions to step SA41 to terminate the displaying and end present procedure. In the case where the projector 1 has started outputting audio in step SA37, the projector 1 stops outputting the audio in step SA41. When the projector determines in step SA38 that no operation of instructing a change in the settings has been performed (NO in step SA36), the projector 1 does not execute step SA39 but transitions to step SA40.

1-4. Effects of Embodiment

As described above, the method for controlling the projector 1 described in the first embodiment includes causing the projector 1 to project a projection image by using the first setting values 56 with the projector 1 attached to the base apparatus 2, which specifies the direction in which the projector 1 projects the image light PL and the position where the projector 1 is installed. The method includes changing the settings of the projector 1 from the first setting values 56 to the second setting values 57 when the projector 1 is detached from the base apparatus 2. The method includes changing the settings of the projector 1 from the second setting values 57 to the first setting values 56 when the projector 1 detects that the projector 1 has been attached to the base apparatus 2. The set of first setting values 56 and the set of second setting values 57 each include a parameter relating to the geometric correction of the projected image.

Therefore, when the projector 1 is attached to the base apparatus 2, the settings of the projector 1 are made based on the first setting values 56 including the parameter relating to geometric correction in correspondence with the direction in which the projector 1 projects the image light PL and the position where the projector 1 is installed. When the projector 1 is detached from the base apparatus 2, the settings of the projector 1 are made based on the second setting values 57. The frequency of the operation of changing the settings of the projection apparatus 10 including the geometric correction parameter in accordance with the location where the projector 1 is used can thus be reduced. The settings of the projector 1, which can be detached from the base apparatus 2 and carried around, can therefore be readily changed in accordance with the location where the projector 1 is installed.

The method for controlling the projector 1 may include detecting that the projector 1 has been attached to the base apparatus 2 when the projector 1 receives a control signal outputted by the base apparatus 2 in response to the attachment of the projector 1 to the base apparatus 2 sensed by the switch 25 provided in the base apparatus 2. In this case, the base apparatus 2 detects that the projector 1 has been attached to the base apparatus 2, and the base apparatus 2 transmits a control signal to the projector 1, so that the projector 1 can sense that the projector 1 has been attached to the base apparatus 2. The base apparatus 2 therefore performs operation of outputting the control signal to allow the projector 1 to quickly sense that the projector 1 has been attached to the base apparatus 2.

The method for controlling the projector 1 may include detecting that the projector 1 has been attached to the base apparatus 2 when the projector detects that electric power is supplied to the projector 1 from the base apparatus 2. In this case, the projector 1 can quickly sense that the projector 1 has been attached to the base apparatus 2.

The method for controlling the projector 1 may include causing the projector 1 to sense that the projector 1 has been attached to the base apparatus 2 when the projector 1 detects that an image signal is inputted to the projector 1 from the base apparatus 2. In this case, the base apparatus 2 performs operation of outputting the image signal to allow the projector 1 to quickly sense that the projector 1 has been attached to the base apparatus 2.

The method for controlling the projector 1 may include detecting that the projector 1 has been attached to the base apparatus 2 when the projector 1 detects operation performed on the operation section 31 or the remote control 7 provided in the projector 1. Specifically, the user attaches the projector 1 to the base apparatus 2, and then operates the operation section 31 or the remote control 7 to perform operation of indicating that the projector 1 has been attached to the base apparatus 2. The projector 1 can therefore make settings corresponding to the fact that the projector 1 has been attached to the base apparatus 2 based on the user's operation.

The method for controlling the projector 1 may include storing the first setting values 56 in the memory 53 provided in the projector 1 and updating the first setting values 56 stored by the first storage section when the projector 1 accepts the operation of changing the first setting values 56. In this case, in the state in which the first setting values 56 are set, the projector 1 updates the first setting values 56 based on the operation performed on the operation section 31 or the remote control 7. The user can therefore readily change the first setting values 56.

The projection system 100 includes the projection 1 including the projection apparatus 10, which projects a projection image, and the controller 50, and the base apparatus 2, which specifies the direction in which the projector 1 projects the image light PL and the position where the projector 1 is installed when the projector 1 is attached to the base apparatus 2. The controller 50 causes the projection apparatus 10 to project a projection image based on the first setting values 56 with the projector 1 attached to the base apparatus 2. The controller 50 changes the settings of the projector 1 from the first setting values 56 to the to the second setting values 57 when the projector 1 is detached from the base apparatus 2. The controller 50 changes the settings of the projector 1 from the second setting values 57 to the to the first setting values 56 when the controller 50 detects that the projector 1 has been attached to the base apparatus 2. The set of first setting values 56 and the set of second setting values 57 each include a parameter relating to the geometric correction of the projected image.

According to the thus configured projection system 100, when the projector 1 is attached to the base apparatus 2, the settings of the projector 1 are made based on the first setting values 56 including the parameter relating to the geometric correction in correspondence with the direction in which the projector 1 projects the image light PL and the position where the projector 1 is installed. When the projector 1 is detached from the base apparatus 2, the settings of the projector 1 are made based on the second setting values 57. The frequency of the operation of changing the settings of the projection apparatus 10 including the geometric correction parameter in accordance with the location where the projector 1 is used can thus be reduced. The settings of the projector 1, which can be detached from the base apparatus 2 and carried around, can therefore be readily changed in accordance with the location where the projector 1 is installed.

2. Second Embodiment

Figure 7:
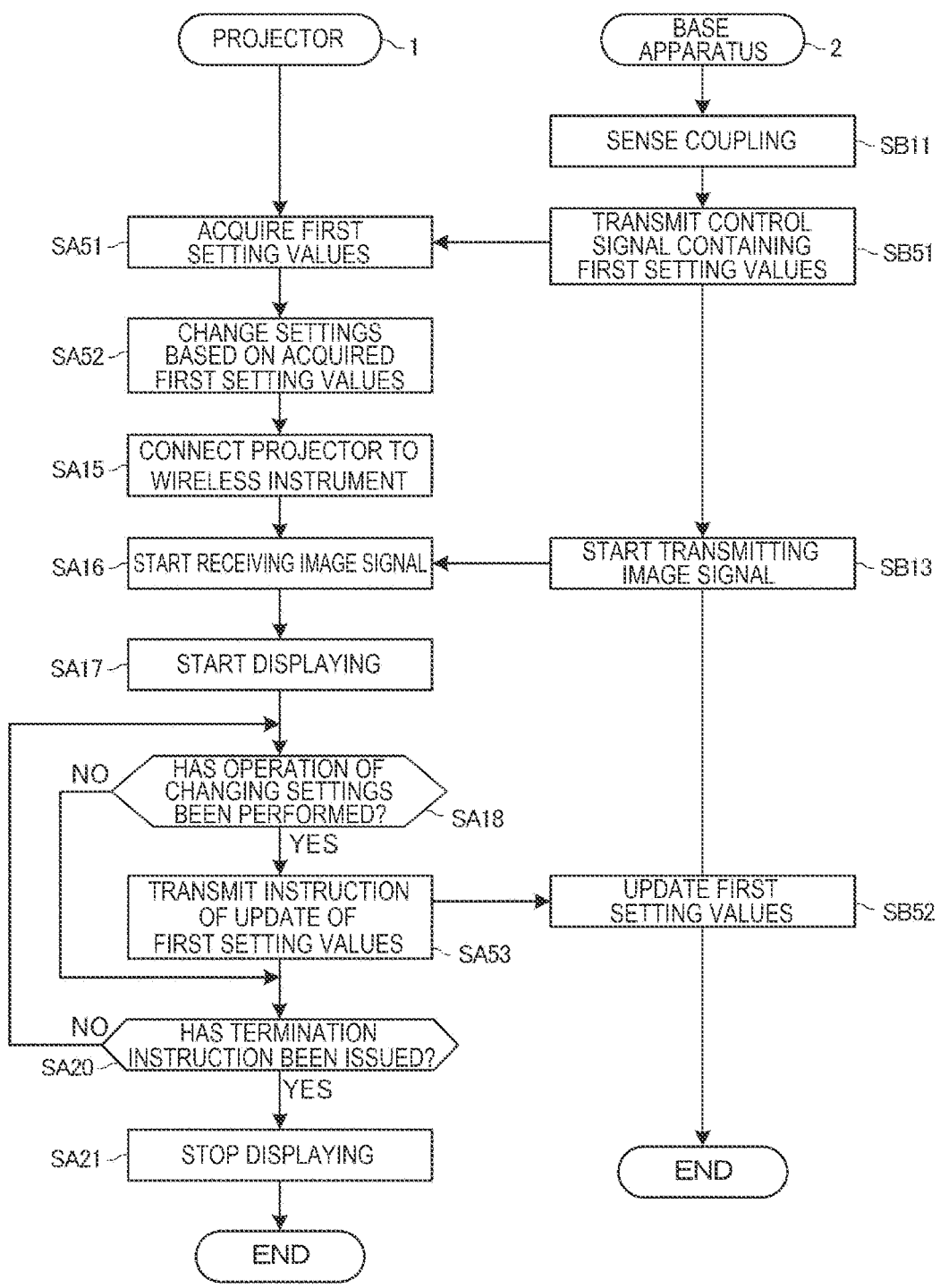
FIG. 7 is a sequence diagram showing the action of the projection system according to a second embodiment.

FIG. 7 is a sequence diagram showing the action of the projection system 100 according to a second embodiment. In the second embodiment, the configuration of the projection system 100 is the same as that in the first embodiment, and no illustration or description of the configuration of the projection system 100 will be made.

In the second embodiment, the memory 213 stores the first setting values 56. The base apparatus 2 is fixed or installed at the location where the projector 1 is used so as to specify the projection direction LD and the installation position of the projector 1, as shown in FIG. 4. The base apparatus 2 stores in the memory 213 appropriate first setting values 56 corresponding, for example, to the relative positional relationship between the location where the base apparatus 2 is installed and the screen SC. For example, the first setting values 56 stored by the base apparatus 2A include setting values suitable for the case where the projector 1 is operated at the location where the base apparatus 2A is installed. The first setting values 56 stored by the base apparatus 2B include setting values suitable for the case where the projector 1 is operated at the location where the base apparatus 2B is installed. In this case, the first setting values 56 stored by the base apparatus 2 may not include the base ID 560. The memory 213 corresponds to an example of a second storage section.

The action shown in FIG. 7 is the action performed when the projector 1 is not attached to the base apparatus 2 and the projector 1 is then attached to the base apparatus 2 and performed in place of the action in FIG. 5 in the first embodiment. In FIG. 7, the controller 50 carries out the processes in steps SA15 to SA18, SA20, SA21, SA51, SA52, and SA53, and the transmission control section 210 carries out the processes in steps SB11, SB13, SB51, and SB52. In FIG. 7, processes common to those in FIG. 5 have the same step numbers and will not be described.

The base apparatus 2 detects in step SB11 that the projector 1 has been coupled to the base apparatus 2 and then transitions to step SB51. In step SB51, the base apparatus 2 transmits a control signal containing the first setting values 56 to the projector 1.

The projector 1 receives the control signal transmitted by the base apparatus 2 an step SA51 to sense that the projector 1 has been coupled to the base apparatus 2. The projector 1 transitions to step SA52, where the projector 1 acquires the first setting values 56 contained in the control signal transmitted by the base apparatus 2 and changes the settings of the portions of the projector 1 including the projection apparatus 10 based on the acquired first setting values 56. The projector 1 then transitions to step SA15.

In step SA18, the projector 1 evaluates whether or not the operation of instructing a change in the settings relating to the action of the projector 1 has been performed, for example, via the operation section 31 or the remote control 7. When the operation of instructing a change in the settings is performed (YES in step SA18), the projector 1 transitions to step SA53 to instruct the base apparatus 2 to update the first setting values 56.

The base apparatus 2 updates in step SB52 the first setting values 56 stored by the memory 213 in accordance with the instruction transmitted by the projector 1.

The projection system 100 described in the second embodiment can provide the same effects as those provided by the first embodiment.

The method for controlling the projector 1 described in the second embodiment further includes transmitting the first setting values 56 stored in the memory 213 provided in the base apparatus 2 to the projector 1 from the base apparatus 2 when the projector 1 detects that the projector 1 has been attached to the base apparatus 2. Thereafter, when the projector 1 accepts the operation of changing the settings thereof to the first setting values 56, the projector 1 updates the first setting values 56 stored by the memory 213.

The settings including the optical system of the projector 1 can thus be appropriately set in accordance with the environment in which the projector 1 is used. The configuration in which the base apparatus 2 stores as the first setting values 56 the setting values of the projector 1 in the environment in which the base apparatus 2 to which the projector 1 can be attached is installed allows the projector 1 to be appropriately set in accordance with the environment in which the projector 1 is used even when the projector 1 does not store the first setting values 56 in advance. The projector 1 can therefore be appropriately and readily set even when the projector 1 is used in an unknown environment.

3. Third Embodiment

Figure 8:
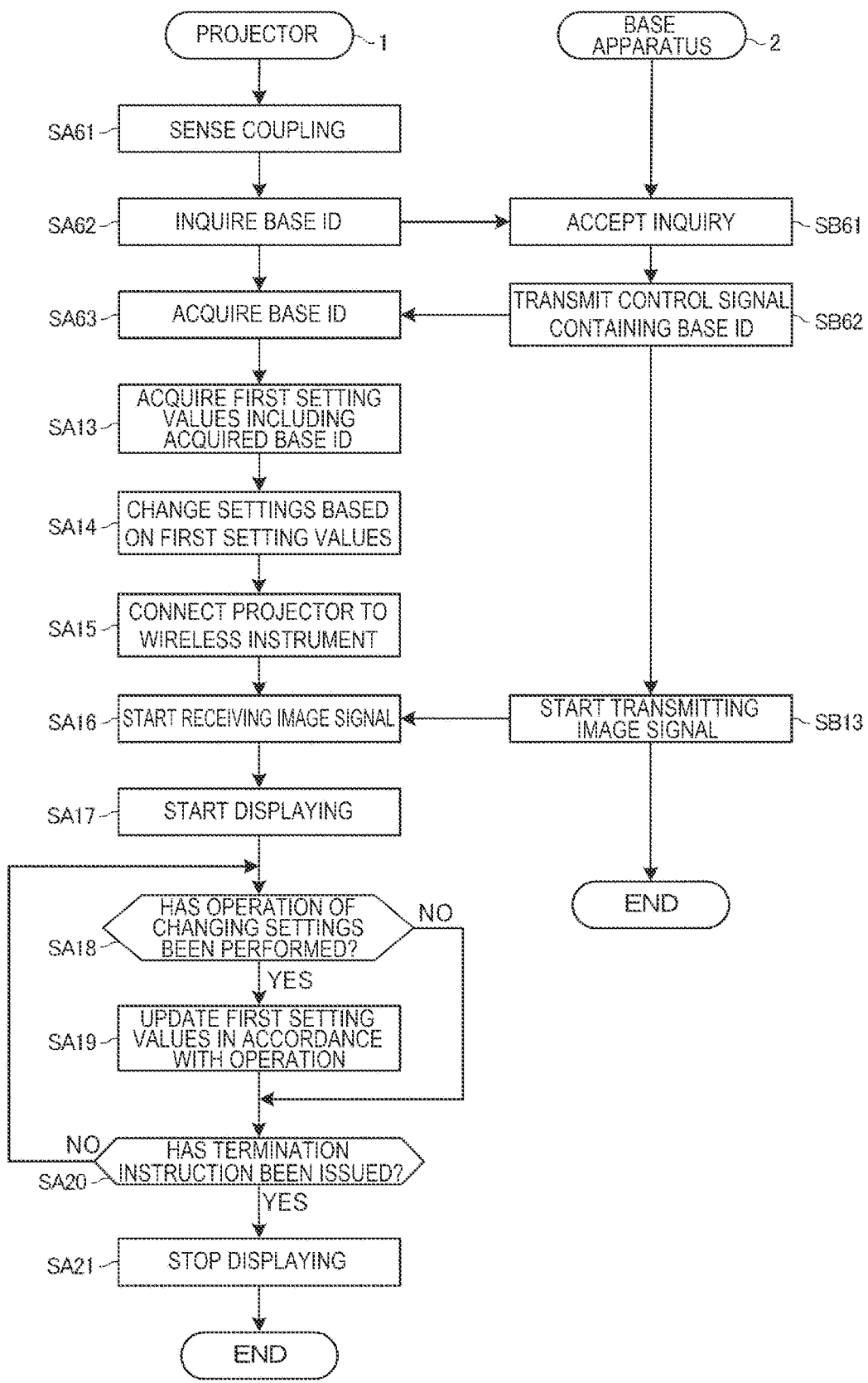
FIG. 8 is a sequence diagram showing the action of the projection system according to a third embodiment.

FIG. 8 is a sequence diagram showing the action of the projection system 100 according to a third embodiment. In the third embodiment, the configuration of the projection system 100 is the same as that in the first embodiment, and no illustration or description of the configuration of the projection system 100 will be made.

In the third embodiment, the projector 1 detects that the projector 1 has been attached to the base apparatus 2 and notifies the base apparatus 2 of the attachment. In the configuration described above, the base apparatus 2 does not need to sense that the projector 1 has been attached to the base apparatus 2 with the aid, for example, of the switch 25.

The action shown in FIG. 8 is the action performed when the projector 1 is not attached to the base apparatus 2 and the projector 1 is then attached to the base apparatus 2 and performed in place of the action in FIG. 5 in the first embodiment. In FIG. 8, the controller 50 carries out the processes in steps SA13 to SA21 and SA61 to SA63, and the transmission control section 210 carries out the processes in steps SB13, SB61, and SB62. In FIG. 8, processes common to those in FIG. 5 have the same step numbers and will not be described.

In step SA61, the projector 1 detects that the projector 1 has been coupled to the base apparatus 2. In step SA61, the method for detecting that the projector 1 has been coupled to the base apparatus 2 can be any of the methods in Specific Examples 1 to 4 described above.

The projector 1 transitions to the step SA62, where the projector 1 inquires of the base apparatus 2 the base ID.

The base apparatus 2 accepts in step SB61 the inquiry made by the projector 1. The base apparatus 2 transitions to step SB62, where the base apparatus 2 transmits a control signal containing the base ID 216 stored by the memory 213 to the projector 1.

In step SA63, the projector 1 receives the control signal transmitted by the base apparatus 2 and acquires the base ID contained in the received control signal. The following actions of the projector 1 and the base apparatus 2 are the same as those in step SA13 and the following steps described in the first embodiment.

The projection system 100 described in the third embodiment can provide the same effects as those provided by the first embodiment.

The method for controlling the projector 1 described in the third embodiment further includes causing the projector 1 to sense that the projector 1 has been attached to the base apparatus 2 and causing the projector 1 to inquire of the base apparatus 2 the base ID. The base apparatus 2 therefore does not need to sense that the projector 1 has been attached to the base apparatus 2. The configuration of the base apparatus 2 can thus be simplified.

4. Other Embodiments

The embodiments described above are preferable embodiments of the present disclosure. The present disclosure is, however, not limited to the embodiments described above, and a variety of variations are conceivable to the extent that the variations do not depart from the substance of the present disclosure.

In the first and third embodiments described above, the projector may store first setting values 56 independent of a specific base apparatus 2. That is, the projector 1 may store general-purpose first setting values 56 that are not associated with a specific base ID 560. For example, the projector 1 acquires the general-purpose first setting values 56 when no base ID is transmitted from the base apparatus 2 or when no first setting values 56 associated with the base ID transmitted from the base apparatus 2 are stored in the memory 53. The projector 1 can thus project an image even when the projector 1 is attached to the base apparatus 2 but cannot acquire an effective base ID from the base apparatus 2. In this case, in response to the setting value changing instruction issued from the operation section 31 or the remote control 7, the projector 1 may generate new first setting values 56 including a new base ID and store the generated first setting values 56 in the memory 53.

For example, a relay apparatus that amplifies or distributes an image signal may be interposed between the projector 1 and the base apparatus 2. In this case, the projector 1 and the base apparatus 2 are electrically coupled to each other via the relay apparatus. Specifically, the projector 1 is electrically coupled to the relay apparatus via a cable and terminals, and the base apparatus 2 is electrically coupled to the relay apparatus via a cable and terminals. In this case, the coupling between the projector 1 and the base apparatus 2 via the relay apparatus is sensed by at least one of the projector 1 and the base apparatus 2, so that any of the actions shown in the embodiments described above can be applied.

The embodiments described above have been described with reference to the case where the projector 1 projects the image light PL forward, but the aspect of the projection performed by the projector 1 not limited to a specific aspect. For example, the projector 1 may be a rear-projection projector 1. Furthermore, the image light PL may be projected onto a horizontal surface, such as the upper surface of the desk 411 or a three-dimensional object, such as a wall surface of a building.

The configurations of the projector 1 and the base apparatus 2 shown in FIG. 2 each represent a functional configuration and are each not necessarily implemented in a specific form. That is, hardware corresponding to each of the functional portions is not necessarily implemented, and a single processor that executes a program can, of course, achieve the functions of the plurality of functional portions. Furthermore, in the embodiments and variations described above, part of the functions achieved by software may be achieved by hardware, or part of the functions achieved by hardware may be achieved by software.

The process units in the sequence diagrams shown in FIGS. 5, 7, and 8 are process units divided in accordance with the contents of primary processes for easy understanding of the processes carried out by the processors 51 and 211. How to produce the divided process units or the names of the process units do not limit the present disclosure. The processes carried out by the processors 51 and 211 can each be further divided into a larger number of process units, or can each be so divided that one process unit includes a larger number of processes in accordance with the content of the process. Furthermore, the order in which the processes are carried out in the flowchart of FIG. 6 is not limited to that shown in FIG. 6.

The control program 55 executed by the processor 51 can instead be recorded, for example, on a recording medium readable by the projector 1. The recording medium can be a magnetic or optical recording medium or a semiconductor memory device. Specific examples of the recording medium may include a flexible disk, a CD-ROM (compact disk read only memory), a DVD, a Blu-ray Disc, a magneto-optical disk, a flash memory, and a portable or immobile recording medium, such as a card-shaped recording medium. The programs can be stored, for example, in a server apparatus, and the projector 1 can download the programs from the server apparatus to achieve the display control method described above. The same holds true for the control program 215 executed by the processor 211. Blu-ray is a registered trademark.

What is claimed is:

1. A projector controlling method comprising:
projecting, by a projector, a projection image by using first setting values including a parameter relating to geometric correction of the projection image when the projector is attached to a base apparatus, the base apparatus defining a direction in which the projector projects projection light and a position where the projector is installed;
changing settings of the projector from the first setting values to second setting values including a parameter relating to geometric correction of the projection image when the projector is detached from the base apparatus; and
changing the settings of the projector from the second setting values to the first setting values when the projector detects that the projector is attached to the base apparatus, wherein the first setting values include identification information for identifying the base apparatus, and the parameter relating to the geometric correction of the projection image when the projector is attached to the base apparatus is associated with the identification information.

2. The projector controlling method according to claim 1, further comprising detecting that the projector is attached to the base apparatus when the base apparatus detects that the projector is attached to the base apparatus and the projector receives a control signal from the base apparatus.

3. The projector controlling method according to claim 1, further comprising detecting that the projector is attached to the base apparatus when the projector detects that electric power is supplied from the base apparatus to the projector.

4. The projector controlling method according to claim 1, further comprising detecting that the projector is attached to the base apparatus when the projector detects that an image signal is inputted from the base apparatus to the projector.

5. The projector controlling method according to claim 1, further comprising detecting that the projector is attached to the base apparatus when the projector detects that a button, a switch, or a remote control provided at part of the projector is operated.

6. The projector controlling method according to claim 1, further comprising:
   storing the first setting values in a first memory provided in the projector; and
   updating the first setting values stored by the first memory when the projector accepts an operation of changing the first setting values.

7. The projector controlling method according to claim 1, further comprising updating the first setting values stored by a second memory provided in the base apparatus when the projector detects that the projector is attached to the base apparatus and accepts an operation of changing the first setting values stored by the second memory.

8. A projection system comprising:
   a projector including
      a lens that projects a projection image, and
      one or more processors programmed to:
         project the projection image via the lens by using first setting values including a parameter relating to geometric correction of the projection image when the projector is attached to a base apparatus,
         change settings of the projector from the first setting values to second setting values including a parameter relating to geometric correction of the projection image when the projector is detached from the base apparatus, and
         change the settings of the projector from the second setting values to the first setting values when the projector detects that the projector is attached to the base apparatus, wherein
   the first setting values include identification information for identifying the base apparatus, and
   the parameter relating to the geometric correction of the projection image when the projector is attached to the base apparatus is associated with the identification information; and
   the base apparatus defines, when the projector is attached thereto, a direction in which the projector projects image light and a position where the projector is installed.

* * * * *